(12) United States Patent
Jarvis et al.

(10) Patent No.: US 12,218,938 B2
(45) Date of Patent: *Feb. 4, 2025

(54) USING TOKENS FROM PUSH NOTIFICATION PROVIDERS TO ENHANCE DEVICE FINGERPRINTING

(71) Applicant: Capital One Services, LLC, McLean, VA (US)

(72) Inventors: Daniel Alan Jarvis, Vienna, VA (US); Patrick Zearfoss, Leesburg, VA (US); Salman Haq, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,697

(22) Filed: Oct. 13, 2023

(65) Prior Publication Data

US 2024/0114026 A1 Apr. 4, 2024

Related U.S. Application Data

(63) Continuation of application No. 17/233,769, filed on Apr. 19, 2021, now Pat. No. 11,831,641.

(51) Int. Cl.
*H04L 9/40* (2022.01)
(52) U.S. Cl.
CPC ........ *H04L 63/0876* (2013.01); *H04L 63/102* (2013.01)
(58) Field of Classification Search
CPC .......................... H04L 63/0876; H04L 63/102
See application file for complete search history.

(56) References Cited

U.S. PATENT DOCUMENTS

| | | | |
|---|---|---|---|
| 9,119,067 B2 * | 8/2015 | Santamaria | H04W 12/069 |
| 10,419,418 B2 * | 9/2019 | Grajek | H04L 63/0807 |
| 10,733,646 B2 | 8/2020 | Douglas et al. | |
| 10,754,941 B2 * | 8/2020 | Angal | H04L 63/10 |
| 10,771,263 B2 | 9/2020 | Smith et al. | |

(Continued)

OTHER PUBLICATIONS

Fernandez et al., OpenID Connect Client Initiated Backchannel Authentication Flow—Core 1.0 draft-03, Jan. 22, 2020, https://openid.net/specs/openid-client-initiated-backchannel-authentication-core-1_0.html.

*Primary Examiner* — Khoi V Le
(74) *Attorney, Agent, or Firm* — Sterne, Kessler, Goldstein & Fox P L.L.C.

(57) ABSTRACT

Embodiments disclosed are directed to a system that performs steps to perform enhanced device fingerprinting. The system at least at receives from an application, a plurality of device attributes identifying a client device on which the application is being used. The plurality of device attributes includes a push token provided by a push token service to the client device. The push token is uniquely paired to the client device. The system further transmits, to a device database, the plurality of device attributes for storage in a device profile. The system also transmits, to the application, a push notification based on the push token. The system receives, from the application, a deliverable status indicating whether the push notification was successfully transmitted to the client device, and transmits, to a notification database, the deliverable status for storage in a notification delivery profile. The system can use the information to authenticate a device.

20 Claims, 5 Drawing Sheets

(56) References Cited

U.S. PATENT DOCUMENTS

| | | |
|---|---|---|
| 2017/0201518 A1 | 7/2017 | Holmqvist et al. |
| 2017/0206525 A1 | 7/2017 | Sylvain |
| 2019/0305955 A1 | 10/2019 | Verma et al. |
| 2022/0337588 A1 | 10/2022 | Jarvis et al. |

* cited by examiner

USING TOKENS FROM PUSH NOTIFICATION PROVIDERS TO ENHANCE DEVICE FINGERPRINTING

CROSS-REFERENCE TO RELATED APPLICATIONS

This application is a continuation of U.S. application Ser. No. 17/233,769, filed on Apr. 19, 2021, the contents of which is incorporated by reference herein in its entirety.

TECHNICAL FIELD

Embodiments relate to device fingerprinting, specifically a system that uses push tokens and push notifications to enhance device fingerprinting.

BACKGROUND

Device fingerprinting is a technique that many applications use to uniquely identify a device in their ecosystem. Device fingerprinting is achieved through the use of device fingerprints. Device fingerprints are amalgams of multiple sources of information available on a device. These amalgams can include a variety of information about the device, such as a device serial number, a device name, a device type, or other accessible device information on the device. Device fingerprints are useful in identifying a device and establishing confidence in a device (i.e., establishing device stability). Identifying and establishing confidence in a device is important because once a device is identified, and confidence is established in the device, other devices in the ecosystem may be assured that when sending information to the device, the data they are sending will go to an intended destination and is unlikely to be compromised.

Device fingerprints, however, have drawbacks. For example, many of the sources of information used in device fingerprints may be compromised, resulting in unauthorized devices imitating a device, and thus compromising a device. For example, a device name and serial number may become known by nefarious actors, who can use that information to set up an unauthorized device to imitate the compromised device and intercept data they should not have access to. Thus, systems and methods are needed to address this problem.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
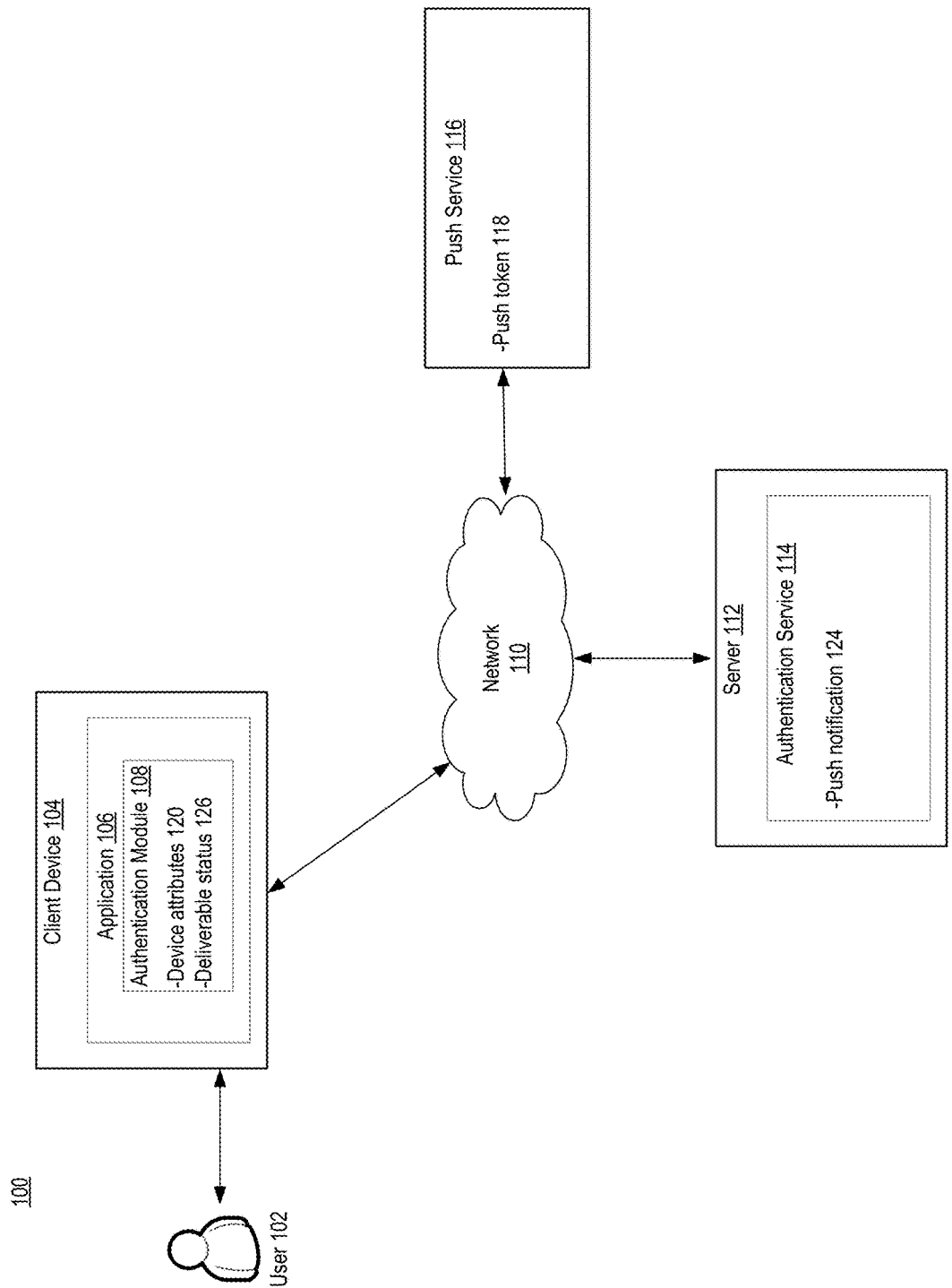
FIG. 1 is an example system for enhanced device fingerprinting according to embodiments.

Embodiments disclosed herein relate to a system and method that allows for enhanced device fingerprinting. The system and method achieves this through the use of push tokens and push notifications. Typically, push notifications are a common way for mobile applications to send messages to users when they are not using the mobile application. Push notifications are transmitted via push notification networks. Push notification networks are typically operated by smartphone operating system providers such as Apple™ and Google™. Push notification networks function by providing a push token to uniquely identify a device and application pair in their network.

Because the push token is provided by the operating system, via the push notification network, to uniquely identify the application and device pair, the push token can provide an excellent source of information for identifying a device and establishing device stability. This is because it provides a third-party source of information that may be used to identify a device. Because the push token is provided by a third-party, it provides an independent source of information that is less susceptible to compromise, even if information about the device itself is compromised. Thus, embodiments disclosed use push tokens and push notifications in a device fingerprinting scheme to provide enhanced device fingerprinting, by incorporating the push token in device fingerprints.

Embodiments disclosed are directed to a computing system that performs the aforementioned enhanced device fingerprinting by performing at least the steps of: at a first time, receive, from an application, a plurality of device attributes identifying a client device on which the application is being used. The plurality of device attributes includes a push token provided by a push token service to the client device. The push token is uniquely paired to the client device. The computing system further transmits, to a device database, the plurality of device attributes for storage in a device profile. The computing system also transmits, to the application, a push notification based on the push token. The computing system receives, from the application, a deliverable status indicating whether the push notification was successfully transmitted to the client device, and transmits, to a notification database, the deliverable status for storage in a notification delivery profile.

At a second time, the computing system receives, from the application, an indication that a user is attempting to perform a high-risk transaction using the application. In embodiments, the high-risk transaction can be a financial transaction where the user is attempting to transfer, withdraw, deposit, etc. money to and from an account via the application. Based on the indication, the computing system requests a further plurality of device attributes to identify a device on which the application is being used. Based on the request, the further plurality of device attributes is received. The computing system compares, by performing a pairwise comparison, the further plurality of device attributes to: the plurality of device attributes received previously at the first time, and the deliverable status received previously at the first time. Based on the comparison, the computing system determines a device risk score. The device risk score indicates whether the user is authorized to perform the high-risk transaction.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. For example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an embodiment of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 is an example system 100 for enhanced device fingerprinting according to embodiments. In some embodiments, system 100 can include a client device 104, a network 110, a push service 116, and a server 112. In some embodiments, the client device 104 can further include an application 106 which, in some embodiments, includes an authentication module 108. In some embodiments, the server 112 can further include an authentication service 114.

The client device 104 may be any of a variety of centralized or decentralized computing devices. For example, the client device 104 may be a mobile device, a laptop computer, or a desktop computer. The client device 104 can function as a stand-alone device separate from other devices of the system 100. Stand-alone refers to a device being able to work and operate independently of other devices. In some embodiments, the client device 104 can store and execute the application 106.

The application 106 refers to a discrete software that provides some specific functionality. For example, the application 106 may be a mobile application that allows a user 102 to perform some functionality. The functionality can, for example and without limitation, allow the user 102 to perform banking, data transfers, or commercial transactions. In some embodiments, the application 106 may be a desktop application that allows the user 102 to perform the aforementioned functionalities.

In some embodiments, the client device 104 can be coupled to the server 112 and the push service 116 via a network 110. The server 112 may be part of a backend computing infrastructure, including a server infrastructure of a company or institution, to which the application 106 belongs. While the server 112 is described and shown as a single component in FIG. 1, this is merely exemplary. In some embodiments, the server 112 can comprise a variety of centralized or decentralized computing devices. For example, the server 112 may include a mobile device, a laptop computer, a desktop computer, grid-computing resources, a virtualized computing resource, cloud computing resources, peer-to-peer distributed computing devices, a server farm, or a combination thereof. The server 112 may be centralized in a single room, distributed across different rooms, distributed across different geographical locations, or embedded within the network 110. While the devices comprising the server 112 can couple with the network 110 to communicate with the client device 104, the devices of the server 112 can also function as stand-alone devices separate from the client device 104.

In some embodiments, if the server 112 is implemented using cloud computing resources, the cloud computing resources may be resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In some embodiments, the server 112 can couple to the client device 104 to allow the application 106 to function. For example, in some embodiments, both the client device 104 and the server 112 can have at least a portion of the application 106 installed thereon as instructions on a non-transitory computer readable medium. The client device 104 and the server 112 can both execute portions of the application 106 using client-server architectures, to allow the application 106 to function.

The push service 116 refers to a service of a push notification network. In some embodiments, the push service 116 and the push notification network may be operated by an independent third-party. For example, the push service 116 and the push notification network may be operated by a provider of the operating system installed on the client device 104. The provider may be, for example and without limitation, Apple™, Google™, or Microsoft™. In some embodiments, the push service 116 can function to provide a push token 118 to the authentication module 108. The push token 118 refers to a unique key, created and assigned by the push service 116 to create a pairing between the application 106 and the client device 104. In other words, the push token 118 can link the application 106 and the client device 104, to uniquely identify the application 106 and the client device 104 as being associated or tied to one another.

In some embodiments, the push service 116 can transmit the push token 118 to the authentication module 108 (and in effect the client device 104) via the network 110. The network 110 refers to a telecommunications network, such as a wired or wireless network. The network 110 can span and represent a variety of networks and network topologies.

For example, the network 110 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 can traverse a number of topologies and distances. For example, the network 110 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 104 and the server 112 as end points of the network 110. This, however, is exemplary and it is understood that the system 100 can have a different partition between the client device 104, the server 112, and the network 110. For example, the client device 104 and the server 112 can also function as part of the network 110.

In some embodiments, the client device 104 can include at least the authentication module 108. In some embodiments, the authentication module 108 may be a module of the application 106. In some embodiments, the authentication module 108 can enable the client device 104 and/or the application 106 to receive the push token 118 transmitted by the push service 116 to the client device 104. In some embodiments, this may be done by having the authentication module 108 couple to the push service 116 via an API to receive the push token 118 as a variable or parameter.

In some embodiments, the authentication module 108 can further enable collection of a plurality of device attributes 120. The plurality of device attributes 120 can refer to a collection of information about the client device 104 that allows fingerprinting of the client device 104. In some embodiments, the plurality of device attributes 120 can include, for example and without limitation, a device serial number, a device name, a device type, the push token 118, or any other accessible device information specific to the client device 104, that can help identify the client device 104. In some embodiments, the plurality of device attributes 120 may be obtained by the authentication module 108 from the operating system of the client device 104 and/or a storage of the client device 104 storing the plurality of device attributes 120. In some embodiments, the authentication module 108, once it collects the plurality of device attributes 120 can combine the plurality of device attributes 120 in a data structure, such as a vector, table, and/or other data object. How the plurality of device attributes 120 is used in the system 100 will be discussed further below.

In some embodiments, the server 112 can include at least the authentication service 114. In some embodiments, the authentication service 114 may be implemented as a software application on the server 112. In some embodiments, the authentication service 114 can enable receipt of the plurality of device attributes 120 from the authentication module 108. This may be done, for example, by having the authentication service 114 couple to the authentication module 108 via an API to receive the plurality of device attributes 120 as a variable or parameter. In some embodiments, the authentication service 114 can further enable transmission of the plurality of device attributes 120 to further devices of the system 100 for storage and retrieval. These further devices, and how they are used will be discussed further below.

In some embodiments, the authentication service 114 can further allow the generation and transmission of a push notification 124 to the authentication module 108. The push notification 124 refers to an automated message transmitted by the authentication service 114 to the authentication module 108. The push notification 124 may be transmitted to the authentication module 108 when the application 106 is or is not being used. In some embodiments, the push notification 124 can appear on the client device 104 and/or the application 106 as a visual notification to the user 102 indicating that the push notification 124 was transmitted and received by the authentication module 108. In some embodiments, the push notification 124, rather than appearing as a visual notification to the user 102, may be received by the authentication module 108 without the user 102 noticing receipt of the push notification 124. In this case, the push notification 124 may be referred to as a silent push. How the push notification 124 is used in the system 100 will be discussed further below.

In some embodiments, the authentication service 114 can further enable the receipt of a deliverable status 126 generated by the authentication module 108. The deliverable status 126 refers to a message, variable, parameter, data structure, or a combination thereof, which indicates whether the push notification 124 was successfully transmitted and received by the authentication module 108. A successful transmission and receipt can indicate that the push notification 124 was received by the authentication module 108 such that the authentication module 108 generates the deliverable status 126 indicating that the push notification 124 was received. In some embodiments, this may be done by the authentication module 108 generating and transmitting as the deliverable status 126 a message, variable, or parameter indicating that the push notification 124 was successfully received. This may be, for example and without limitation, a text string (e.g., "SUCCESSFUL") or a numerical value or code (e.g., "1") indicating successful receipt. In some embodiments, the deliverable status 126 can further include other information. For example, this other information can include, without limitation, a timestamp indicating a time and date that the push notification 124 was received; the value of the push token 118 at the time of receipt; or any of the other information included in the plurality of device attributes 120 of the client device 104 at the time of receipt.

Figure 2:
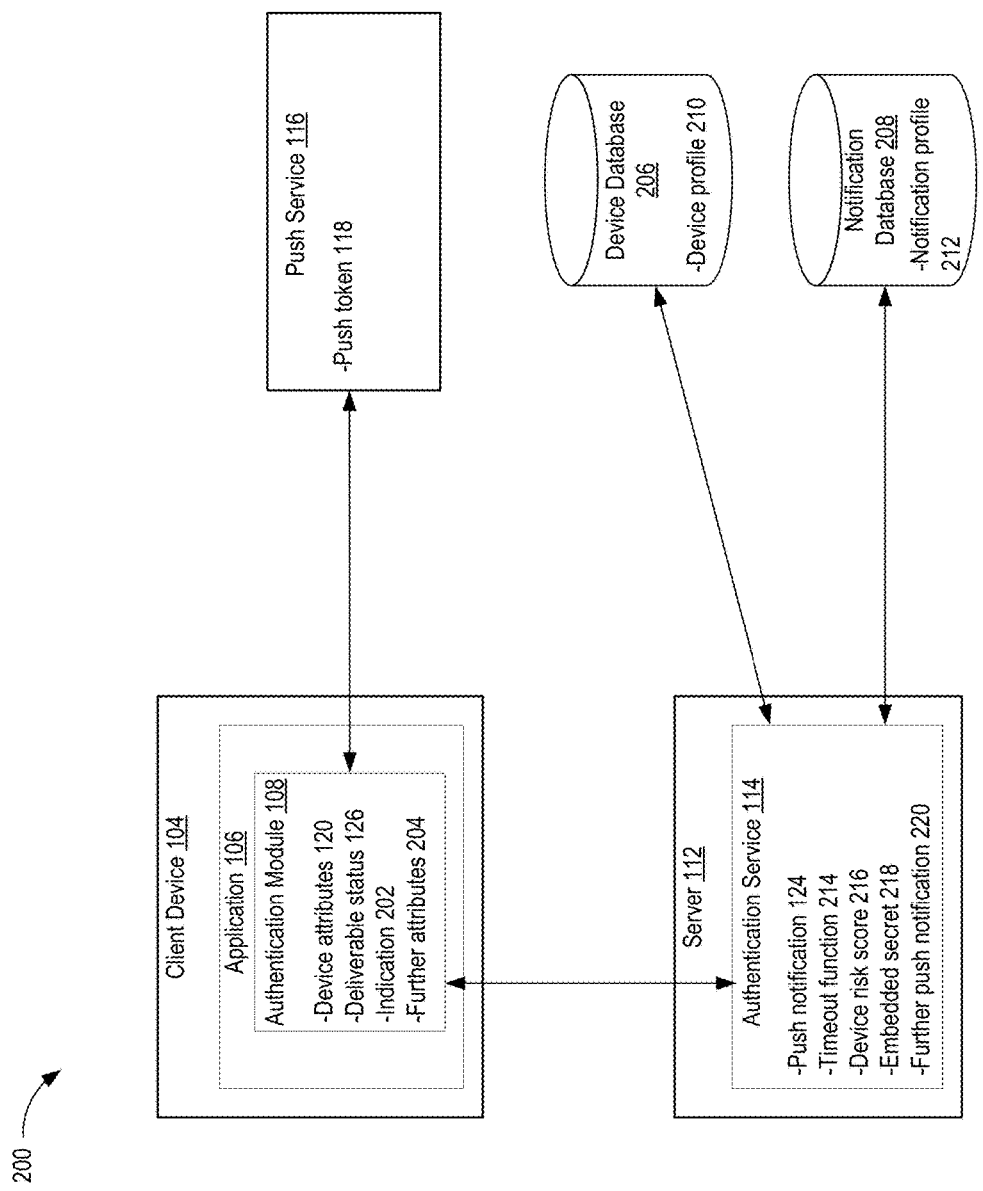
FIG. 2 is an example control flow for the system according to embodiments.

FIG. 2 is an example control flow 200 for the system 100 according to embodiments. Control flow 200 shows how the system 100 in FIG. 1 operates. For the purpose of FIG. 2, it is assumed that some portion or all of the application 106, including the authentication module 108, is installed on the client device 104. It is further assumed that the authentication service 114 is installed on the server 112.

Control flow 200 may begin by having the push service 116 transmit the push token 118 to the authentication module 108. As indicated with respect to FIG. 1, the push token 118 can uniquely identify the client device 104 and application 106 pair. Once received by the authentication module 108, the push token 118 can persist on the client device 104 and/or the application 106 until the push token 118 is either updated or until the application 106 is removed from the client device 104. In some embodiments, the push token 118 can be encrypted.

In some embodiments, once the push token 118 is received, the authentication module 108 can collect the plurality of device attributes 120 from the client device 104.

In some embodiments, the authentication module 108 can perform this collection periodically and based on a predetermined schedule. In some embodiments, the authentication module 108 can include the push token 118 as part of the plurality of device attributes 120 collected. In some embodiments, the authentication module 108 can package the plurality of device attributes 120 into a data structure. In some embodiments, authentication module 108 can, from time to time or based on a predetermined schedule, transmit the collected plurality of device attributes 120 from the client device 104, including the push token 118, to the authentication service 114. For example, in some embodiments and at a first time, the authentication module 108 can transmit the plurality of device attributes 120 to the authentication service 114.

The authentication service 114 can receive the plurality of device attributes 120 and further process the plurality of device attributes 120. In some embodiments, the further processing can include transmitting the plurality of device attributes 120 to further devices of the system 100. In some embodiments, the further devices can include at least a device database 206 and a notification database 208.

The device database 206 may be a database or repository used to store the plurality of device attributes 120. The purpose of the device database 206 is to store, in a list or as table entries, the plurality of device attributes 120 so that a historic record of the plurality of device attributes 120 of the client device 104 may be accumulated over a period of time. In some embodiments, the plurality of device attributes 120 may be stored in a device profile 210. The collection of the accumulated plurality of device attributes 120 in the device profile 210 can collectively be referred to as a first multitude of values. The device profile 210 refers to a database table or list, specific to a device, for example client device 104, which stores historic records of the plurality of device attributes 120 of the device. As will be described further below, the device profile 210 and the values stored therein may be used by the system 100 to authenticate the client device 104.

In some embodiments, once the plurality of device attributes 120 is received by the authentication service 114, the authentication service 114 can store the push token 118 received as part of the plurality of device attributes 120 and/or use the push token 118 to generate and transmit, from time to time or at a predetermined schedule, a push notification 124 to the authentication module 108. The authentication service 114 can do this by using the push token 118 as a type of address for the client device 104, to which it transmits the push notification 124. The purpose of transmitting the push notification 124 to the authentication module 108 (and in effect the client device 104) is to monitor the client device 104, and to determine whether the authentication service 114 can successfully receive and transmit messages or data to the client device 104 and application 106 pair, based on the push token 118.

In some embodiments, if the authentication module 108 successfully receives the push notification 124 from the authentication service 114, the authentication module 108 can generate and transmit a deliverable status 126 indicating successful transmission and receipt of the push notification 124, to the authentication service 114. In some embodiments, the authentication service 114, upon receipt of the deliverable status 126, can further transmit the deliverable status 126 to a notification database 208 to store the deliverable status 126. The notification database 208, similar to the device database 206, may be a database or repository used to store the deliverable status 126. The purpose of the notification database 208 is to store, in a list or as table entries, the deliverable status 126 so that a historic record of the deliverable status 126 may be accumulated over a period of time. In some embodiments, the deliverable status 126 may be stored in a notification profile 212. The notification profile 212 refers to a database table or list which stores historic records of the deliverable status 126. The collection of the accumulated values for the deliverable status 126 in the notification profile 212 can collectively be referred to as a second multitude of values. As will be described further below, the notification profile 212 may be used by the system 100 to authenticate the client device 104.

In some embodiments, the authentication service 114 can further implement a timeout function 214. The timeout function 214 can indicate to the authentication service 114 whether the push notification 124 was not successfully transmitted to the authentication module 108. In some embodiments, the timeout function 214 may be implemented as a software function or method of the authentication service 114. In some embodiments, upon generation and transmission of the push notification 124, the timeout function 214 can function by setting a timer to begin counting to a predetermined value or time. In some embodiments, if the authentication service 114 does not receive the deliverable status 126 from the authentication module 108 by the time it takes to count to the predetermined value or time, the authentication service 114 can determine that the push notification 124 was not successfully transmitted to the authentication module 108. In some embodiments, based on a determination that there was an unsuccessful transmission of the push notification 124, the authentication service 114 can generate a message, variable, parameter, data structure, or a combination thereof, which indicates the unsuccessful transmission, and can transmit the same to the notification database 208 for storage as part of the second multitude of values in a similar manner that the deliverable status 126 is stored.

In some embodiments, the system 100 can perform the aforementioned processes once, over a period of time, or on an ongoing basis, such that historic records of both the plurality of device attributes 120 and deliverable status 126 are accumulated. Once accumulated and saved to the device profile 210 and the notification profile 212, the historic records may be used to authenticate the client device 104.

In some embodiments, authentication of the client device 104 may be performed anytime a user 102 takes some action using the application 106, that the application 106 deems to be high-risk. In embodiments, a high-risk transaction can be, for example, a financial transaction where the user 102 is attempting to transfer, withdraw, deposit, etc. money to or from an account via the application 106. These transactions will be referred to as a "high-risk transaction" or "high-risk transactions" throughout this disclosure. In some embodiments, the system 100 can require that every time a user 102 wants to perform a high-risk transaction, additional authentication and verification must take place so that the device from which the request to perform the high-risk transaction originates is validated as a trusted device. Taking the example where the application 106 is used by a user 102 to perform banking, data transfers, or commercial transactions, a high-risk transaction, may be defined to be a transaction where a user 102 wants to transact using money. This may be, for example and without limitation, transferring money from one account or person to another, via the application 106. In the case of such a high-risk transaction, the system 100 will want to verify that the device that the user 102 is using is in fact a trusted device, for example client device 104, before allowing the high-risk transaction to proceed. The aforementioned example is merely exemplary and not meant to be limiting as to what the high-risk transaction can be.

For the purposes of discussion, with respect to FIG. 2, it is assumed that the high-risk transaction is performed by a user 102 at a second time different from the first time. Because the high-risk transaction is performed at a second time which is different from the first time, the system 100 cannot assume that the user 102 or device attempting to perform the high-risk transaction is the same user 102 and client device 104 of the first time, because in the time between the second time and the first time, the client device 104 may have become compromised such that a nefarious user, which would now assume the role of the user 102, could have stolen or gotten a hold of information identifying the client device 104, and is now attempting to use that information to imitate client device 104, via a non-trustworthy device, to perform the high-risk transaction for illicit purposes. Thus, an authentication must be performed by the system 100 to make sure the device making the request for the high-risk transaction, is in fact a trusted device of the system 100, for example client device 104.

In some embodiments, and at the second time, this authentication may be performed when the authentication module 108 alerts the authentication service 114 that a user 102 is using the application 106 to attempt to perform a high-risk transaction. This may be done by the authentication module 108 generating an indication 202. In some embodiments, the indication 202 can take the form of a signal, variable, or parameter, and may be transmitted by the authentication module 108 to the authentication service 114 in order to alert the authentication service 114 that a user 102 has started the process, or requested, via the application 106 on a device, to perform a high-risk transaction. Based on receiving the indication 202, the authentication service 114 can generate a request to the authentication module 108 to transmit a further plurality of device attributes 204 to identify the device on which the user 102 is making the request from. The further plurality of device attributes 204 may be similar to the plurality of device attributes 120 and can be a collection of information regarding the device on which the high-risk transaction is attempting to be performed.

In some embodiments, based on receiving the request, the authentication module 108 can collect the further plurality of device attributes 204. In some embodiments, once the authentication module 108 collects the further plurality of device attributes 204, the authentication module 108 can transmit the further plurality of device attributes 204 to the authentication service 114. In some embodiments, the authentication service 114 can receive the further plurality of device attributes 204. In some embodiments, the authentication service 114 can compare the further plurality of device attributes 204 to the values of the device profile 210 and the notification profile 212. The purpose of doing the comparison is to determine to what extent the further plurality of device attributes 204 match the historic records for the plurality of device attributes 120 and the deliverable status 126 for the client device 104. If the results of the comparison yield similar values, the authentication service 114 can determine that the device is likely the client device 104 and is trustworthy.

In some embodiments, in addition to comparing the further plurality of device attributes 204 to the historic records for the plurality of device attributes 120, the authentication service 114 can also compare the push token 118 for each successful and unsuccessful transmission of a push notification 124 to a push token 118 included in the further plurality of device attributes 204, if one is provided as part of the further plurality of device attributes 204. In this way, the authentication service 114 can determine whether the push token 118 received as a part of the further plurality of device attributes 204 has been used previously, and whether it has been used to successfully transmit messages to a trustworthy device, for example client device 104.

In some embodiments, the authentication service 114 can perform the comparison by performing a pairwise comparison of the values for the further plurality of device attributes 204 and the values in the device profile 210 and the notification profile 212. A pairwise comparison refers to a process of comparing data in pairs to judge which of each data is preferred, has a greater amount of some quantified property, or whether or not the two values are identical. In some embodiments, based on the comparison, the authentication service 114 can determine a device risk score 216.

The device risk score 216 refers to a quantitative value indicating how trustworthy the device wanting to perform the high-risk transaction is. In some embodiments, based on the value determined for the device risk score 216, the authentication service 114 can authorize the high-risk transaction to proceed on the device. The device risk score 216 may be determined in a variety of different ways. For example, in some embodiments, the device risk score 216 may be determined based on determining a value for each pairwise comparison and/or summing each value to obtain the device risk score 216. By way of example, each pairwise comparison can result in a value. In some embodiments, this value may be, for example, "1" if there is a match between the values and "0" if there is not a match between the values. After performing the pairwise comparison, all the values of 1's and 0's may be summed to determine the device risk score 216. The aforementioned values are merely exemplary and not meant to be limiting.

In some embodiments, a weighting value may also be incorporated to determine the device risk score 216. The weighting value can give greater weight to certain information incorporated in the plurality of device attributes 120, the further plurality of device attributes 204, and the deliverable status 126. By way of example, if the plurality of device attributes 120 and the further plurality of device attributes 204 contain a field indicating a push token 118, this particular field may be given a specific weighting to emphasize its importance when determining whether a device is trustworthy. For example, in some embodiments, this value may be any real number in a range from {0,1}, with "1" being the greatest weight. For the purposes of this example, it is assumed that the weighting value given to a push token 118 is "1". Thus, if a match is found between the push token 118 of the further plurality of device attributes 204 and the push token 118 of a record in the device profile 210, the value generated based on a match can further be multiplied by the weighting value (in this case "1"). The aforementioned values are merely exemplary and not meant to be limiting.

In some embodiments, once the device risk score 216 is determined, based on the device risk score 216, the authentication service 114 can determine whether the device is trustworthy or not. Based on the determination the authentication service 114 can allow the device to perform the high-risk transaction or not. In some embodiments, the authentication service 114 can do this by comparing the device risk score 216 to a set of predetermined thresholds indicating whether a device is trustworthy or not. In some embodiments, the predetermined thresholds may be, for example and without limitation, two thresholds having two separate values (a first threshold value and a second threshold value). In some embodiments, the first threshold value may be greater than the second threshold value. In some embodiments, the first threshold value may be less than the second threshold value. In some embodiments, based on where the device risk score 216 lies amongst the threshold values, the authentication service 114 can determine whether the device is trustworthy or not, thus allowing or preventing the high-risk transaction.

By way of example, the authentication service 114 can implement a system of rules or if-else statements to make the determination. In some embodiments, the rules or if-else statements can have conditions such as:

- If the device risk score 216 is equal to or greater than a first threshold value the device is trustworthy, and thus, the authentication service 114 should allow the device and/or user 102 to perform the high-risk transaction;
- If the device risk score 216 is equal to or greater than a second threshold value and is less than the first threshold value, additional authentication needs to take place to determine whether to authorize the device and/or user 102 to perform the high-risk transaction; and
- If the device risk score 216 is less than the second threshold value the device is not trustworthy, and thus, the authentication service 114 should not authorize the device and/or user 102 to perform the high-risk transaction.

The aforementioned rules or if-else statements are exemplary and not meant to be limiting. In some embodiments, if rules or if-else statements are put in place to require additional authentication based on a value for the device risk score 216, the authentication service 114 can implement the additional authentication. The additional authentication may be implemented in a variety of ways. In some embodiments, and without limitation, the additional authentication can include using a further push notification 220 generated and transmitted by the authentication service 114 to the device and/or the authentication module 108 of the device. In some embodiments, the further push notification 220 can have, as a part of its message an embedded secret 218. The embedded secret 218 can assist in further authenticating the device.

The embedded secret 218 refers to a text string, numerical value, or alpha-numeric value that may be transmitted as a part of the further push notification 220. In some embodiments, the authentication service 114 can transmit the further push notification 220 to the device and/or authentication module 108 of the device. In some embodiments, the authentication module 108 can have instructions that if a further push notification 220 is received by the authentication module 108, it should perform some function based on the further push notification 220. In some embodiments, the function may be to transmit back, to the authentication service 114, the embedded secret 218. In this way, the authentication service 114 can further verify that the device it is transmitting the embedded secret 218 to is a trustworthy device and authorize the device and/or user 102 to perform the high-risk transaction.

In some embodiments, the function may be to perform some computation on the embedded secret 218 resulting in a processed version of the embedded secret 218. The computations may be, for example and without limitation, a hashing function, a reordering, some mathematical operations, or a combination thereof on the embedded secret 218. In some embodiments, once the computations are performed on the embedded secret 218, the processed version of the embedded secret 218 may be transmitted back to the authentication service 114. In some embodiments, the authentication service 114 can compare the processed version of the embedded secret 218 to some expected value. For example, in some embodiments, the authentication service 114 can know what processing is to take place by the authentication module 108 and/or know what the expected value of the processed version of the embedded secret 218 should be. In some embodiments, if the processed version of the embedded secret 218 matches the expected value, the authentication service 114 can determine that the device is trustworthy and authorize the device and/or user 102 to perform the high-risk transaction.

In some embodiments, the further authentication can include the authentication service 114 transmit the further push notification 220 and/or request the user 102 to provide some type of response to the further push notification 220. The response may be, for example and without limitation, a response to a question, an additional password, additional identifying information, or similar response that may be provided by the user 102 to assist in further authenticating the device.

In some embodiments, the further authentication can include the authentication service 114 transmit the further push notification 220 and have the authentication service 114 measure the response time between when the further push notification 220 was transmitted and any response provided by the authentication module 108. The response may be, for example and without limitation, transmitting back an embedded secret 218, a processed version of the embedded secret 218, or a response to a question, an additional password, an additional identifying information, etc. Based on the response time, the authentication service 114 can determine whether the device is trustworthy. For example, unexpectedly long response times (e.g., greater than a predetermined threshold time) might indicate a man-in-the-middle attack on the device, resulting in the authentication service 114 determining that the device is not trustworthy.

In some embodiments, machine learning processes may be incorporated into the aforementioned authentication processes of FIG. 2. For example, a machine learning process, such as a neural network, may be incorporated with the authentication service 114, to identify patterns for responding to the further authentication responses. For example, in some embodiments, the neural network can determine patterns in responses given by devices and/or users 102 to similar authentication challenges, based on historical data on which the neural network can be trained on to recognize the patterns. For example, in some embodiments where the authentication service 114 will require some type of response to the further push notification 220, the neural network can determine whether the response is in line with responses provided by users or devices to the further push notification challenges in the past, by comparing the response time to typical response times it has learned over a period of time, or comparing the answer given to typical answers to the same authentication challenges to the to determine any deviations. For example, based on the comparison, the authentication service 114 can determine whether the response time or answer is within an acceptable deviation or threshold, and based on the same determine whether the device is trustworthy. For example, in some embodiments, if the authentication service 114 expects some percentage of delivery problems for responses based on the patterns determined, the authentication service 114 can determine that if the response time is provided too quickly or too accurately, such that it exceeds or falls outside the range of the percentage of delivery problems expected, it can determine that the device is untrustworthy.

The aforementioned control flow 200 may be performed by the modules, units, or services of the client device 104 and the server 114 and/or may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as part of the system 100 and/or installed as a removable portion of the system 100.

It has been discovered that the system 100 described above significantly improves the state of the art from previous systems because it provides an enhanced method of performing device fingerprinting. The enhancement stems from the use of the push token 118, the push notification 124, and the further push notification 220, in conjunction with the historic values of the plurality of device attributes 120 and the deliverable status 126, stored in the device profile 210 and the notification profile 212. Based on the aforementioned information, a device risk score 216 used to authenticate a device is determined. By using the push token 118, which is provided by a third-party, the values used to fingerprint devices become more trustworthy. This is because in order for a nefarious user to compromise a device of the system 100 and attempt to imitate the device, a nefarious user needs to obtain both device information of the device and value of the push token 118. This would require the nefarious user to infiltrate two systems, the device itself and the push token service 116, to obtain all the information needed to imitate the user 102 and/or the client device 104. This is difficult to do and is unlikely to occur.

Furthermore, the use of historic device information, for example the values stored in the device profile 210 and the notification profile 212 allows the system 100 to provide a better authentication of devices. This is because the determination is based on trends and device information, rather than individual snapshots of device information to determine whether a device is trustworthy. The trends allow the system to determine what a device fingerprint typically looks like over a period of time. If the further plurality of device attributes 204 matches or is similar to the historic information, it can provide a good indication that the device is a trustworthy device.

It has been further discovered that the system 100 significantly improves the art by leveraging machine learning processes, such as neural networks, to authenticate devices. The machine learning processes can provide intelligence to the system 100, by allowing the system 100 to determine trends and patterns in responses to the further push notification 220 to allow the system 100 to further refine the authentication processes it implements. As a result, more accurate authentication may be performed.

Methods of Operation

Figure 3:
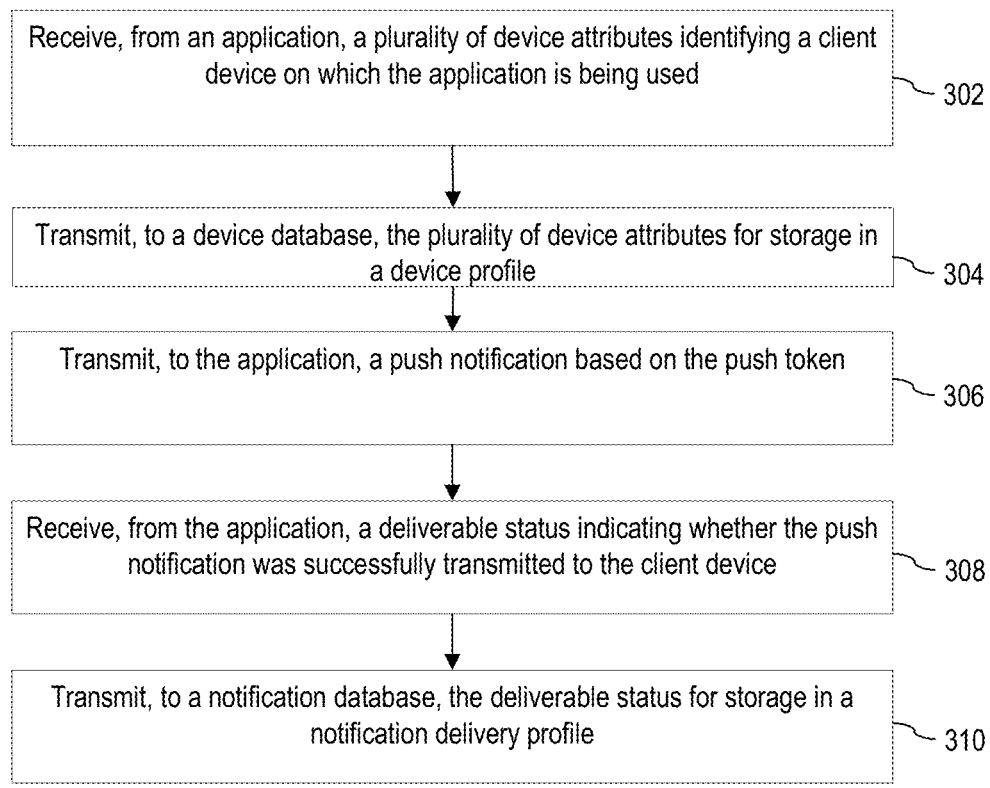
FIG. 3 is an example method of operating the system according to embodiments.

FIG. 3 is an example method 300 of operating the system 100 according to embodiments. Method 300 indicates how the server 114 operates at a first time. In some embodiments, method 300 operates to allow the server 114 to receive, by one or more computing devices and from an application 106, a plurality of device attributes 120 identifying a client device 104 on which the application 106 is being used, as shown in 302. The plurality of device attributes 120 can include a push token 118 provided by a push service 116 to the client device 104. The push token 118 is uniquely paired to the client device 104. The server 114 further transmits, by the one or more computing devices and to a device database 206, the plurality of device attributes 120 for storage in a device profile 210, as shown in 304. The server 114 transmits, by the one or more computing devices and to the application 106, a push notification 124 based on the push token 118, as shown in 306. The server 114 receives, by the one or more computing devices and from the application 106, a deliverable status 126 indicating whether the push notification 124 was successfully transmitted to the client device 104, as shown in 308. The server 114 transmits, by the one or more computing devices and to a notification database 208, the deliverable status 126 for storage in a notification profile 212, as shown in 310.

Figure 4:
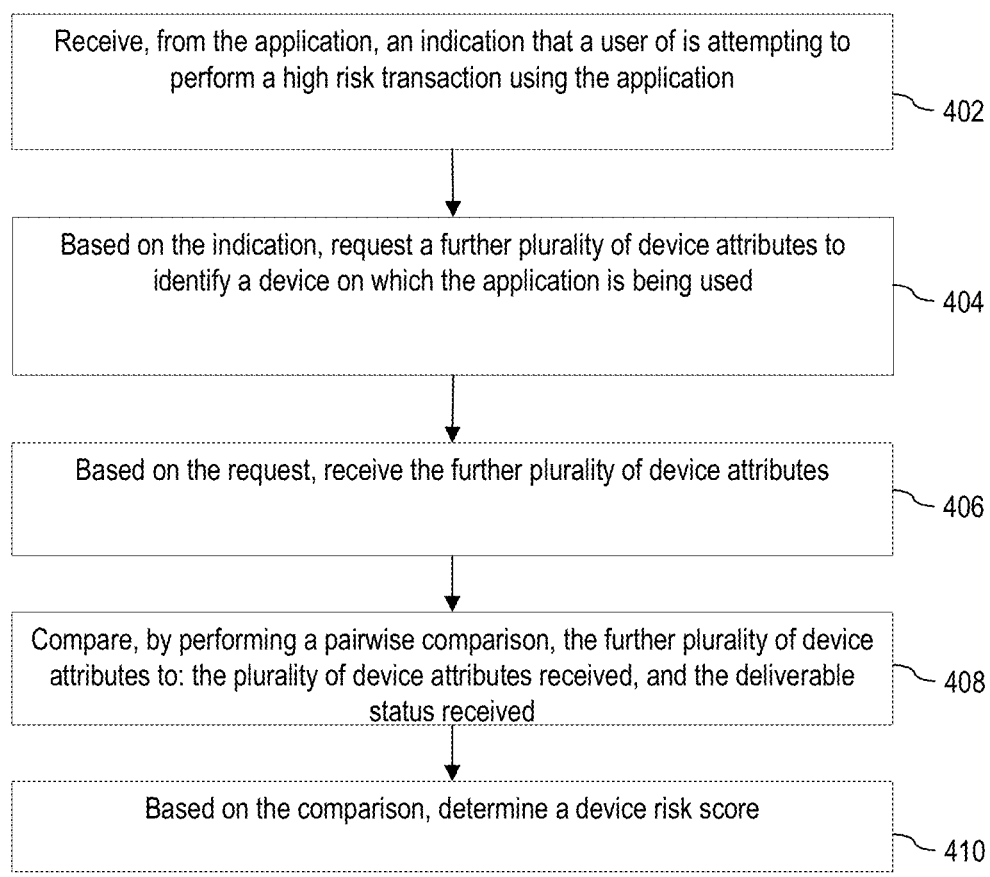
FIG. 4 is a further example method of operating the system according to embodiments.

FIG. 4 is a further example method 400 of operating the system 100 according to embodiments. Method 400 indicates how the server 114 operates at a second time. In some embodiments, method 400 operates to allow the server 114 to receive, by the one or more computing devices and from the application 106, an indication 202 that a user 102 is attempting to perform a high-risk transaction using the application 108, as shown in 402. Based on the indication 202, the server 114 requests, by the one or more computing devices, a further plurality of device attributes 204 to identify a device on which the application 106 is being used, as shown in 404. Based on the request, the server 114 receives, by the one or more computing devices, the further plurality of device attributes 204, as shown in 406. The server 114 compares, by the one or more computing devices and by performing a pairwise comparison, the further plurality of device attributes 204 to: the plurality of device attributes 120 received at the first time and the deliverable status 126 at the first time, as shown in 408. Based on the comparison the server 114 determines, by the one or more computing devices, a device risk score 216, as shown in 410. The device risk score 216 indicates whether the user 102 is authorized to perform the high-risk transaction.

In some embodiments, operation of methods 300 and 400 are performed, for example, by system 100, in accordance with embodiments described above.

Components of the System

Figure 5:
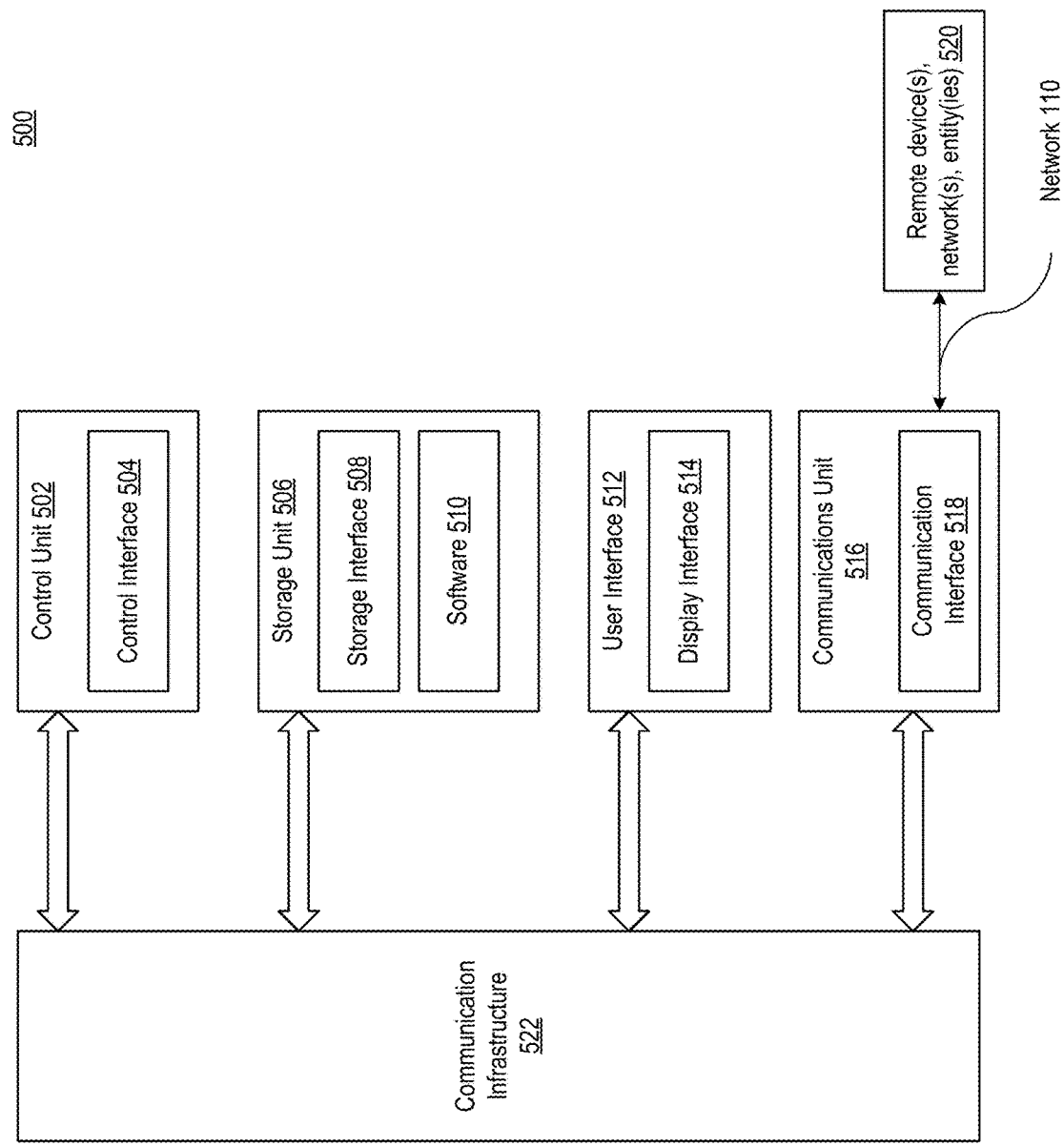
FIG. 5 is an example architecture of components implementing the system according to embodiments.

FIG. 5 is an example architecture 500 of components implementing the system 100 according to embodiments. The components may be implemented by any of the devices of the system 100, for example the client device 104, the server 114, or the push service 116. In some embodiments, the components may include a control unit 502, a storage unit 506, a communication unit 516, and a user interface 512. The control unit 502 may include a control interface 504. The control unit 502 may execute a software 510 (e.g., the application 106, the authentication module 108, or the authentication service 114) to provide some or all of the intelligence of system 100. The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of system 100, for example the client device 104, the server 114, the push service 116, the device database 206, and the notification database 208. The control interface 504 may also be used for communication that is external to the functional units or devices of system 100. The control interface 504 may receive information from the functional units or devices of system 100, or from remote devices 520, or may transmit information to the functional units or devices of system 100, or to remote devices 520. The remote devices 520 refer to units or devices external to system 100.

The control interface 504 may be implemented in different ways and may include different implementations depending on which functional units or devices of system 100 or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of system 100 or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of system 100. The storage interface 508 may also be used for communication that is external to system 100. The storage interface 508 may receive information from the other functional units or devices of system 100 or from remote devices 520, or may transmit information to the other functional units or devices of system 100 or to remote devices 520. The storage interface 508 may include different implementations depending on which functional units or devices of system 100 or remote devices 520 are being interfaced with the storage unit 506. The storage interface 508 may be implemented with technologies and techniques similar to the implementation of the control interface 504.

The communication unit 516 may enable communication to devices, components, modules, or units of system 100 or to remote devices 520. For example, the communication unit 516 may permit the system 100 to communicate between the client device 104, the server 112, the push service 116, the device database 206, and the notification database 208. The communication unit 516 may further permit the devices of system 100 to communicate with remote devices 520 such as an attachment, a peripheral device, or a combination thereof through the network 110.

As previously indicated, the network 110 may span and represent a variety of networks and network topologies. For example, the network 110 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 may traverse a number of network topologies and distances. For example, the network 110 may include direct connection, personal area network (PAN), local area network (LAN), metropolitan area network (MAN), wide area network (WAN), or a combination thereof.

The communication unit 516 may also function as a communication hub allowing system 100 to function as part of the network 110 and not be limited to be an end point or terminal unit to the network 110. The communication unit 516 may include active and passive components, such as microelectronics or an antenna, for interaction with the network 110. The communication unit 516 may include a communication interface 518. The communication interface 518 may be used for communication between the communication unit 516 and other functional units or devices of system 100 or to remote devices 520. The communication interface 518 may receive information from the other functional units or devices of system 100, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by system 100. In some embodiments, the user interface 512 allows a user to interface with the devices of system 100 or remote devices 520. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by system 100. The control unit 502 may also execute the software 510 to present information generated by system 100, or to control other functional units of system 100. The display interface 514 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 300 and 400, and system 100 are cost-effective, highly versatile, and accurate, and may be implemented by adapting components for ready, efficient, and economical manufacturing, application, and utilization. Another important aspect of embodiments of the present disclosure is that it valuably supports and services the historic trend of reducing costs, simplifying systems, and/or increasing performance.

These and other valuable aspects of the embodiments of the present disclosure consequently further the state of the technology to at least the next level. While the disclosed embodiments have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the embodiments illustrated, but by the appended claims and their equivalents.

What is claimed is:

1. A computer implemented method for enhanced device fingerprinting, the method comprising:
    at a first time:
    (a) receiving, by one or more computing devices and from an application, a push token identifying a client device on which the application is being used, wherein the push token is provided by a push service operated by an independent third-party, to the client device, and wherein the push token is uniquely paired to the client device,
    (b) transmitting, by the one or more computing devices and to the application, a push notification based on the push token,
    (c) receiving, by the one or more computing devices and from the application, a deliverable status indicating whether the push notification was successfully transmitted to the client device,
    (d) based on receiving the deliverable status indicating the push notification was successfully transmitted, storing, by the one or more computing devices, the push token;
    at a second time:
    (e) receiving, by the one or more computing devices and from the application, an indication that a user is attempting to perform a high-risk transaction using the application,
    (f) based on the indication, requesting, by the one or more computing devices, a further push token to identify a device on which the application is being used,
    (g) based on the request in (f), receiving, by the one or more computing devices, the further push token,
    (h) comparing, by the one or more computing devices, the push token stored in (d) to the further push token received in (g); and
    (i) based on the comparison in (h), determining, by the one or more computing devices, a device risk score, wherein the device risk score indicates whether the user is authorized to perform the high-risk transaction.

2. The method of claim 1, further comprising authorizing, by the one or more computing devices, the user to perform the high-risk transaction if the device risk score is equal to or greater than a first threshold value.

3. The method of claim 1, further comprising performing, by the one or more computing devices, additional authentication to determine whether to authorize the user to perform the high-risk transaction if the device risk score is less than a first threshold value.

4. The method of claim 3, wherein performing the additional authentication includes:
    transmitting a further push notification to the device on which the application is being used in (f), wherein the further push notification includes an embedded secret;
    receiving, from the device, the embedded secret; and
    based on receiving the embedded secret from the device, authorizing the user to perform the high-risk transaction.

5. The method of claim 3, wherein performing the additional authentication includes:
    transmitting a further push notification to the device on which the application is being used in (f), wherein the further push notification includes an embedded secret;
    receiving, from the device, a processed version of the embedded secret;
    determining whether the processed version of the embedded secret matches an expected value; and
    authorizing the user to perform the high-risk transaction if the processed version of the embedded secret matches the expected value.

6. The method of claim 5, wherein the processed version of the embedded secret is a result of a hashing function, a reordering, or a mathematical operation performed on the embedded secret.

7. The method of claim 1, further comprising preventing, by the one or more computing devices, the user from performing the high-risk transaction if the device risk score is less than the first threshold value.

8. A non-transitory computer readable medium including instructions for causing a processor to perform operations for enhanced device fingerprinting, the operations comprising:
    at a first time:
    (a) receiving, by one or more computing devices and from an application, a push token identifying a client device on which the application is being used, wherein the push token is provided by a push service operated by an independent third-party, to the client device, and wherein the push token is uniquely paired to the client device,
    (b) transmitting, by the one or more computing devices and to the application, a push notification based on the push token,
    (c) receiving, by the one or more computing devices and from the application, a deliverable status indicating whether the push notification was successfully transmitted to the client device,
    (d) based on receiving the deliverable status indicating the push notification was successfully transmitted, storing, by the one or more computing devices, the push token;
    at a second time:
    (e) receiving, by the one or more computing devices and from the application, an indication that a user is attempting to perform a high-risk transaction using the application, (f) based on the indication, requesting, by the one or more computing devices, a further push token to identify a device on which the application is being used, (g) based on the request in (f), receiving, by the one or more computing devices, the further push token, (h) comparing, by the one or more computing devices, the push token stored in (d) to the further push token received in (g); and (i) based on the comparison in (h), determining, by the one or more computing devices, a device risk score, wherein the device risk score indicates whether the user is authorized to perform the high-risk transaction.

9. The non-transitory computer readable medium of claim 8, wherein the operations further comprise authorizing, by the one or more computing devices, the user to perform the high-risk transaction if the device risk score is equal to or greater than a first threshold value.

10. The non-transitory computer readable medium of claim 8, wherein the operations further comprise performing, by the one or more computing devices, additional authentication to determine whether to authorize the user to perform the high-risk transaction if the device risk score is less than a first threshold value.

11. The non-transitory computer readable medium of claim 10, wherein performing the additional authentication includes:

transmitting a further push notification to the device on which the application is being used in (f), wherein the further push notification includes an embedded secret;
receiving, from the device, the embedded secret; and
based on receiving the embedded secret from the device, authorizing the user to perform the high-risk transaction.

12. The non-transitory computer readable medium of claim 10, wherein performing the additional authentication includes:

transmitting a further push notification to the device on which the application is being used in (f), wherein the further push notification includes an embedded secret;
receiving, from the device, a processed version of the embedded secret;
determining whether the processed version of the embedded secret matches an expected value; and
authorizing the user to perform the high-risk transaction if the processed version of the embedded secret matches the expected value.

13. The non-transitory computer readable medium of claim 12, wherein the processed version of the embedded secret is a result of a hashing function, a reordering, or a mathematical operation performed on the embedded secret.

14. The non-transitory computer readable medium of claim 8, wherein the operations further comprise preventing, by the one or more computing devices, the user from performing the high-risk transaction if the device risk score is less than the first threshold value.

15. A computing system for enhanced device fingerprinting comprising:

a memory configured to store instructions;
a processor, coupled to the memory, configured to process the stored instructions to perform operations comprising:
at a first time:
(a) receiving from an application a push token identifying a client device on which the application is being used, wherein the push token is provided by a push service operated by an independent third-party, to the client device, and wherein the push token is uniquely paired to the client device, (b) transmitting to the application a push notification based on the push token, (c) receiving from the application a deliverable status indicating whether the push notification was successfully transmitted to the client device, (d) based on receiving the deliverable status indicating the push notification was successfully transmitted, storing the push token;

at a second time:
(e) receiving from the application an indication that a user is attempting to perform a high-risk transaction using the application, (f) based on the indication, requesting a further push token to identify a device on which the application is being used, (g) based on the request in (f), receiving the further push token, (h) comparing the push token stored in (d) to the further push token received in (g); and (i) based on the comparison in (h), determining a device risk score, wherein the device risk score indicates whether the user is authorized to perform the high-risk transaction.

16. The computing system of claim 15, wherein the operations further comprise:

authorizing the user to perform the high-risk transaction if the device risk score is equal to or greater than a first threshold value; or
preventing the user from performing the high-risk transaction if the device risk score is less than the first threshold value.

17. The computing system of claim 15, wherein the operations further comprise performing additional authentication to determine whether to authorize the user to perform the high-risk transaction if the device risk score is less than a first threshold value.

18. The computing system of claim 17, wherein performing the additional authentication includes:

transmitting a further push notification to the device on which the application is being used in (f), wherein the further push notification includes an embedded secret;
receiving, from the device, the embedded secret; and
based on receiving the embedded secret from the device, authorizing the user to perform the high-risk transaction.

19. The computing system of claim 17, wherein performing the additional authentication includes:

transmitting a further push notification to the device on which the application is being used in (f), wherein the further push notification includes an embedded secret;
receiving, from the device, a processed version of the embedded secret;
determining whether the processed version of the embedded secret matches an expected value; and
authorizing the user to perform the high-risk transaction if the processed version of the embedded secret matches the expected value.

20. The computing system of claim 19, wherein the processed version of the embedded secret is a result of a hashing function, a reordering, or a mathematical operation performed on the embedded secret.

* * * * *